United States Patent [19]
Ellacott

[11] Patent Number: 5,752,028
[45] Date of Patent: May 12, 1998

[54] OBJECT-ORIENTED QUERY MECHANISM

[76] Inventor: Bruce Arthur Ellacott, 51 Waverley Street, Ottawa, Ontario, Canada, K2P 0T7

[21] Appl. No.: 627,197

[22] Filed: Apr. 3, 1996

[51] Int. Cl.[6] .................................................. G06F 17/30
[52] U.S. Cl. .................................... 395/614; 395/603
[58] Field of Search ................................ 395/614, 603

[56] References Cited

U.S. PATENT DOCUMENTS

| | | | |
|---|---|---|---|
| 5,212,787 | 5/1993 | Baker et al. | 395/612 |
| 5,291,583 | 3/1994 | Bapat | 395/500 |
| 5,313,629 | 5/1994 | Abraham et al. | 395/614 |
| 5,437,027 | 7/1995 | Bannon et al. | 395/614 |
| 5,471,629 | 11/1995 | Risch | 395/617 |
| 5,542,078 | 7/1996 | Martel et al. | 395/612 |
| 5,564,119 | 10/1996 | Krawchuck et al. | 395/604 |
| 5,619,713 | 4/1997 | Baum et al. | 395/613 |
| 5,652,882 | 7/1997 | Doktor | 395/617 |

*Primary Examiner*—Wayne Amsbury
*Attorney, Agent, or Firm*—Alix, Yale & Ristas, LLP

[57] ABSTRACT

The invention is a method for making joins and retrieving joined data during query processing in a database. An object sends a message with join criteria to one or more other objects or classes of objects. Objects receiving the message forward the data which they have or data which may potentially be useful to a receiving object, then stop processing, without waiting for a reply. Messages for a particular object are processed in a queue without reference to messages for other objects.

10 Claims, 1 Drawing Sheet

OBJECT-ORIENTED QUERY MECHANISM

FIELD OF THE INVENTION

This invention relates to data processing, and to a method for the efficient processing of queries which attempt to draw pertinent data from a database.

BACKGROUND

At the present time there are two competing database models in common usage: relational model and the object-oriented database model. The older hierarchical and network models are still being used and sold, but they generally considered to be not viable for the future. The advocates of the relational model have expanded their model into the so-called extended-relational model, accommodating some of the requirements the object-oriented model satisfies. The advocates of the object-oriented model have likewise attempted to move in the direction of providing better query facilities, etc., comparable to the relational model. It is expected that the relational and object-oriented models will converge in an object-relational model, and it fact there are already some products which are said to be object-relational.

Chris Date in *A Guide to DB2*, Addison-Wesley Publishing, 1984, states that the "relational model is concerned with three aspects of data: data structure, data integrity, and data manipulation" The data manipulation in the relational model is dependent on the data structure. Data records (relations) must be composed of fields which are all atomic, they cannot be decomposed. A list of telephone numbers, for example, would not be allowed. The object-oriented model, in contrast, does not have such constraints.

In relational databases, data may be joined together, by a process known as a "join". The term "join" in this application is used in a broader sense than the common relational usage. Here it is considered to be "a query in which data is retrieved from more than one class.". Generically in the process of this invention, it is a method initiated by passing a message. This type of join includes a simple equi-join such as if server.attr1=client.attr1 then return server.attr2 and more complex joins falling within this definition.

A relational table is considered as a class where the attributes are simple. To do a relational join, two tables are input to the join and a third new table is the result. The join occurs on two fields, one in each table. For example, a student table might be joined with a marks table (which recorded marks by student number) to produce a third table which gave student number, class, mark, student name, and student address. Here the join occurs on the field student number which occurs in both tables. A join provides a means of retrieving and combining data from two tables. The capability to do this has been limited in object-oriented databases. The object-oriented model allows complex, non-atomic data while relational manipulation has been dependent on a normalized atomic data structure. Current commercial object-oriented databases have some limited query capability but mostly use pointer navigation (following pointers from one object to another).

Objects encapsulate data and methods (functions). Objects interact only through messages. Data cannot be accessed directly. When an object receives a message it starts one of its methods. When the method completes executing it returns a result to the object which sent the message. It is possible to join two objects by having one object send another object a message.

K. Tanaka and T. Chang in their paper "On Natural Joins in Object-Oriented Databases" from *Deductive and Object-oriented Databases*, Elsevier Science Publishers, 1990, develop a theory of natural joins for object-oriented databases. The natural join is a special case of the join—where tuples have one or more fields with the same names and values & the results are reduced so that there is only tuple per two joined tuples. There are of course many joins which are not "natural joins" as described in the paper. A join could also be field A>field B, for example.

In their concluding remarks Tanaka and Chang state that further research will be needed "to develop efficient processing techniques for object composition operations including our natural join". This application is the result of such research. It proposes an efficient means of joining normalized or complex objects efficiently in a database management system. Further, it is not limited to the "natural joins" postulated by Tanaka and Chang, but is a general method useable for many different types of join.

BRIEF DESCRIPTION OF THE INVENTION

The invention relates to a system for efficiently satisfying queries involving joins of arbitrarily complex objects. A "query" in this application is defined as any request to read and/or update a database or databases, including distributed databases.

In the simplest case, a message is sent to one object. This object generates an output, which can be either a message or a direct data transfer, as for example, a write to memory. The object, once it has generated its output, stops processing without regard to what happens to the output. Thus, processing is asynchronous, in that each object processes the message or messages which it receives, generates an output, and then shuts down processing without waiting for a reply.

A database query using this system is made up of either one or a number of coordinated object methods (functions) which are either programmed directly into the database definitions of the relevant object classes or generated into such object methods from a declarative query language. As queries process in a multi-user environment, messages directed to particular objects in an object class, selections of objects in an object class, or all objects in an object class will be queued to assist in the optimized retrieval of the data for the objects, and the execution of relevant object methods. In a preferred embodiment, the queue will allow an ordered retrieval of particular objects, simultaneous with the processing of messages directed to all objects in an object class. In other words, if data for an object is retrieved, all the messages directed to this object will be processed before the data for this object is flushed from core memory. Preferably, however, there will be an override to permit processing outside this ordered retrieval scheme, giving higher priority messages directed to particular objects, or sets of objects retrievable by indexed methods, preference over messages directed to all objects in the class.

According to the invention, a method initiated by a message processes an object until it is finished. If the method has sent messages on to other objects, the method does not wait for results. If data in the method's object is needed as part of the query results, it is sent back to a location indicated by the original message (or some equivalent means to determine location). This can be done by message passing to a results object (including the creation of that object if necessary) or by other means such as direct writes to the memory of the results object. In this disclosure, the term "downstream object" will be used to mean objects which receive messages either directly from the current object or from other objects whose messages were directly or indirectly initiated by the Messaging of the current object. If it can not yet be determined if the data in the method's object is needed as part of the query results (for example, because the relevant predicate depends on the results from messages sent to downstream objects) then this data (described herein as "potentially useful" data) is sent back anyway either as the data itself or as pointers to the current object so that easy retrieval will be possible or the data will be retrieved later if needed by one or more messages generated by the downstream objects. These downstream objects will then send a message back to the current object. In one embodiment, the approach used for potentially useful data is varied depending on the particular situation e.g., how large the data is and how likely it is to be needed.

If objects are to be updated during the query or at its finish (defining query here to include updates) then the updates can be entered immediately or pointers can be kept pointing back to the objects to be updated. Locks can be placed on objects which are updated or to be updated and objects read, if this is important for the integrity of the transaction. If a lock exists on an object, the object is by-passed in message processing until the lock no longer exists if the lock type affects the message processing required.

DESCRIPTION OF THE DRAWINGS

The invention will be described with reference to the drawings, in which.

DETAILED DESCRIPTION OF THE INVENTION

Figure 1:
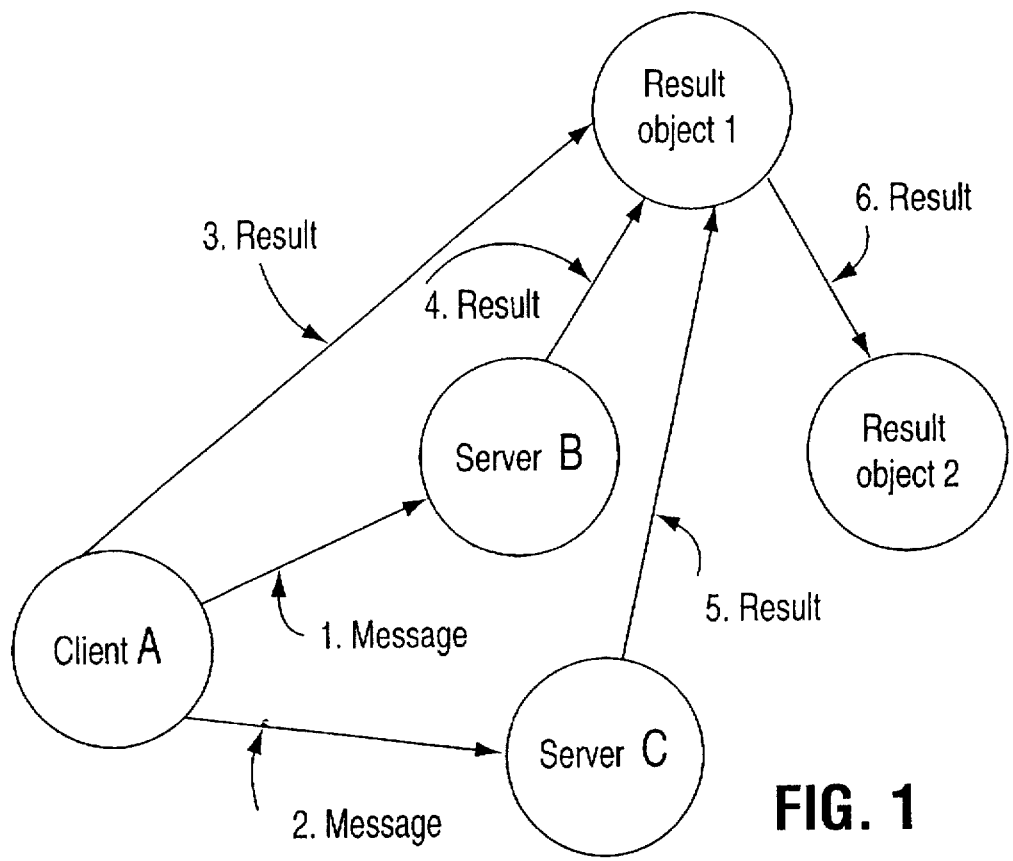
FIG. 1 is a diagrammatic representation of messages passing between objects according to one embodiment of the invention.

The join operation is a means of retrieving data from two structured data instances. They share the same data structure if they are from the same table (in relational parlance) or from the same class (in object-oriented terminology). If they have different data structures then they are from different tables or different classes, excepting cases where attributes are optional or of different size. Subclasses here are considered as different classes. Although generically they are members also of superclasses, they can be considered as classes that partly share the same structure. A relational table record can be considered as a special case of the class instance, limited to simple atomic attributes.

To effect a join, the invention provides that objects can send messages between each other. The parameters of the message can, for example, specify a field value for field T in A (the sending object), and the semantics of the message. If the message is to attempt to make an equi-join on object B's field X, then the semantics would be "Is this value for field T I'm sending you equal to the value you have for field X?" If so, this is an equi-join where A.T=B.X. The message can also include "if it is then send me back the values you have for Y and Z".

The results of the query can be stored in a third object C instantiated (created) by A to store the results.

This is simple enough for two objects and one message. The invention, however, permits handling of complicated queries involving many objects and many different object classes.

In general, just like object B, every object involved in a query will have a predicate (condition) performed on it and zero or more attributes (stored or derived through calculation) which it is requested to return. As part of the predicate there can optionally be sub-conditions which require sending a message to other downstream objects. There can also be a request to send additional data back from these downstream objects, in addition to the predicate results of those objects.

Every query method activated within an object will thus have this common structure. Sometimes it will be possible to determine that the predicate evaluates to "True" based solely on attributes contained within the object and sometimes it will be necessary to send a message to one or more other objects to find out if the predicate evaluates to "True".

For a database management system (DBMS) which has high performance it is desirable to avoid waiting for messages to be returned from downstream objects. It is preferable to "finish" with the current object as soon as possible. The processing of messages by the process of the invention should therefore be asynchronous and non-blocking.

Transaction management and its requirements for locking can be considered as a separate system. If an object is locked it will be temporarily by-passed for message processing. This is discussed in more detail below.

According to the invention, it is desirable to return the data contained within the current object immediately after testing that part of the predicate which can be tested within the present object. Thus in some cases the data is returned with the proviso that it is only valid (i.e., satisfies the query conditions) if the result of one or more other messages have certain return values. If those messages return and invalidate the earlier data as part of the query results, then the earlier data is discarded.

There is more than one way to store this "potentially premature" data. Instead of sending back all needed object data immediately only a pointer to the object can be sent back—giving quick direct access if the later messages turn out to require the object's data. As mentioned, transaction management mechanisms can lock objects read or objects to be updated, under certain conditions. If the result of the query is a selection of one or more objects which are to be updated, then the pointers to those selected objects can be stored ready to be used to update them.

Data that is returned from a method is not generally sent back to the client message-sending object's method. This would require that the method wait for results. Rather, data is sent to a results object either by message passing or by other means such as a direct write to the result object's memory. A "result object", as used herein is an object containing some or all of the results from a query. There can be many result objects for the query and the data from many queried objects can be part of one result object. Data from any object involved in the query is sent to one result object, or is passed in a message to a downstream object and is eventually passed on later by the downstream object's method to a result object or else is used by the downstream object's method to formulate another result which is passed on to a result object. Thus, messages are sent, but replies are not waited for. Alternatively, data can be returned to message-sending object by reactivating that object later by message passing or some equivalent process from "downstream" objects.

Basically there will be three methods of addressing messages to objects:

1) direct pointers (these could take different forms—hash, btree, etc.—but they provide a means of getting to one specific object)

2) a selection condition which can be effected via searching indexes on those object fields which have been indexed—the result of an index search would preferably be a list of direct pointers 3) conditions which can't use an index. This last type of addressing is equivalent to a join. While in the relational model one table is joined with another based on, for example, the equality of a field in each, in this design each object in one table passes a message which is directed to every object in the other table. For example, the message can say "Is the value of your field equal to the value of my field?"

With this message-passing join paradigm the possibilities increase as to what the join criteria are. As example will illustrate this. Suppose a police force wants to join its suspect fingerprint data with the fingerprints found at the scene of a crime... A message including a graphic of a fingerprint could be sent from every at_the_scene_ fingerprint_object to every suspect_object. The message could be "compare the common features of this fingerprint with yours... if n features match return TRUE".)

Objects can have "complex nested structures", in which one or more objects are inside another object. If joins occur within an object for contained objects then either 1. the contained object will be defined in the database as an instance of a separate object class and thus will be treated in the same way as other objects—i.e., messages will be passed to it, or 2. the recursive message passing will be handled by the internal method logic.

In practice the database design functionality will limit how complex each object class can be—if it goes beyond those limits it should be a separate associated object class. The mechanism is concerned with the "surface" interactions between objects.

The sending of a message to every object in a class could be effected with one message. Instead of a direct pointer to one specific object, NULL, for example can be used to mean that this is directed to every object in the class. Another indicator in the message can specify whether this applies to sub-classes as well, in which case it can then be expanded into multiple messages, one for each subclass. Alternately, the method which sends the initial join message can send messages separately to each class and subclass, instead of having messages cascade down to subclasses. This depends on whether subclasses are stored in the same physical storage (file or portion of a file). A number of variations are possible. Each class and its subclasses can reside in one file, or the class can reside in one file and the subclasses in another file. Indeed, all classes can be in one file as long as the message distinguishes which class it is directed to.

An example of the process of the invention will be given where the objects of each class are stored in separate files. Each class's file has an associated message queue, or alternately there can be one queue for all classes, or queues for groups of classes, and designators in the message as to which was the intended class. The queue can conveniently be divided into subqueues for the three methods of addressing objects: direct pointers, index selectable, directed to all objects of the class. The direct pointers are preferably kept in an order to optimize retrieval based on end-to-end passage through the physical file. Such ordering techniques are known in the art. The "directed to all" messages do not need to be sorted because they are each sent to every object in the file. The index selectable messages, as they are processed, generate direct pointers for the direct pointer sub-queue.

Various transaction management solutions, such as pessimistic locking, optimistic locking, etc., can be used with this invention. If an object is locked when a thread process tries to execute a message for that object then the object will be by-passed. If the message was a message directed to all objects of the class then a copy of the message will be created, but directed to that specific object via a direct pointer. The new copy will be placed in that part of the queue which holds messages with direct pointers. When the object becomes unlocked, its message can be processed. Conventional transaction management time-outs, or mediation in a "deadly-embrace" situation or like arrangement, can be used to release locks when no longer needed in known fashion.

The invention is particularly useful when implemented as a multi-user multi-tasking system and especially when distributed on different machines. In a multi-tasking system, remarkably, each queue can be processed independently. There is no requirement for synchronization between queues. Processing therefore becomes very simple. Messages arrive in a queue and a task processes the queue message (as described above). The queues can be processed concurrently by multiple tasks, for example one for each queue or one for each sub-queue.

The methods which comprise the queries can be coded directly for the database object classes concerned. The methods are compiled and stored ready to be dispatched as the query executes, or else can be executed in an interpretive fashion. Alternately, a declarative query in for example, SQL or ODMG's object query language (OQL) can be used to generate methods for the object classes of its query request. These also can be compiled and stored so as to be ready to be dispatched as the query executes, or executed in an interpretive fashion.

With this asynchronous message passing, a means of knowing that all messages were processed and that the query is finished, is needed. This can conveniently be achieved for example by using a count of messages generated but not processed for each distributed node. Each time a new message is generated in a method the message count is incremented. Whenever a message completes processing, the count is decremented. When the count at a node reaches zero the query is complete at that node, at least temporarily. Other messages may of course arrive later to restart query processing at the node if the node is a "secondary" node, i.e., not the one which originated the inquiry. Also, the node can on some occasions have to wait until other nodes are complete if a distributed update using a 2-phase commit or its equivalent is involved.

In a distributed multi-node query the originating node will, during the process of the query, send messages to other nodes. These messages can if desired have three methods of addressing objects as described above: index selections of objects, direct pointers to specific objects, or messages directed to all objects in a class. A prefix in an object pointer can be used for example to indicate a different node. The query construction process will determine that messages should be sent to these other nodes. The need to send a message to another node can also be determined dynamically by a method in the query. The database definition available at a node includes information about the database definition for other nodes, or this information can be gathered from these other nodes. A class, for example, can have object instances on several nodes.

For every message sent from an originating node to a secondary node, the count at the originating node will be incremented. When those messages arrive at the secondary node, the secondary node's node count will also be incremented. When the node count reaches zero at the second node it will send back an indication to the originating node that all the n messages that were sent from that originating node have been processed. The originating node can then decrement its outstanding message count as well. In a multi-node system message could arrive from any other node so instead of this two node scenario there is such an interaction between each two node pair combination between which messages pass. A secondary node can also become an originating node where there is recursive messaging. After messages arrive at a particular node in a multi-node situation it can in some arrangements be difficult to determine their originating node. In such a case, all nodes sending messages to the particular node will be notified when the message-processed count at that node reaches zero. To avoid a deadlock situation where node counts never reach zero because each node is waiting for replies from other nodes, nodes will also send an indication to originating nodes when all messages have been processed except a count equal to or less than the number of messages to which answers are awaited.

An outstanding message count can drop to zero at secondary nodes and start up again multiple times in the same query. Ultimately and lastly the query will quiesce at the originating node. The sending of data back to the originating node from secondary nodes does not have to wait until the message count reaches zero at those nodes. It can be more efficient in some queries to send back data as data becomes available or to use some other scheme. If updates at those secondary nodes are part of the query, then update completion may have to wait until the whole distributed query is completed, if required by the transaction management method in use, such as a distributed transaction management, or 2-phase commit process or its equivalent.

This outstanding message count scheme can be elaborated with hash counts or the like on message fields in known fashion to improve error checking, thus insuring that all messages are properly processed. If errors are found, any updates can be "rolled-back", using known transaction management techniques to restore objects to their state before the query.

Note that there is no application logic requirement to process all the waiting messages for a class in any particular order or even one at a time. If enough process threads are available, the messages can be processed all at once. For purposes of optimizing performance, however, it is usually better to coordinate the physical reads with object method execution, processing all messages for the objects as they are picked up in the physical read. As there are many different physical file organizations, there are various ways of doing this. If one thread is available, for example, it can pass through the file from one end to the other, processing all messages directed to each object as such object is retrieved (or at least before it is flushed from memory). Because the physical reads can pick up more than one object at a time, it is usually better to read all such objects once only rather than reading them a second time.

A set of messages directed to all objects in an object class can be processed by one object then processed again by another object in the class until all objects in the class have processed the set. A thread processing such a set of messages can if desired loop back to the beginning of the objects in a class when finished so that any newly arrived messages will then be processed. In the alternative, multiple threads can be provided, starting at different parts of the file, or starting to process new messages directed to the objects currently being processed right away. This necessitates keeping track that a message was applied to all objects. This can be accomplished by a start object reference or other known means.

The process of this invention envisages that the execution of object methods be non-blocking. An object method does not need to hang in execution waiting for another object's method to finish execution and return a result. A query will be created (generated from declarative statements such as sql, odmg-93, or other database language, produced from a graphical interface, directly coded by a programmer, or other means) such that it is composed of one or more methods of one or more objects (object instance methods or object class methods). Each of these methods should preferably be non-blocking. To achieve this, results are preferably returned to a result object (or equivalent) rather than have the calling client object wait for the result from the server object that is executing the passed message and associated method.

The client object (the object sending the message) can pass a pointer in the message to the server object (an object receiving the message) which will tell the server object where to send the results. Alternately, an equivalent means of specifying location can be used, or a location instruction can be intrinsic to the dbms. The client object also will pass its results to the result object. The results can be for example client object data including object pointers, or data derived from client object data including a boolean yes or no from a predicate evaluation.

At the time a query is generated into possibly multiple methods the structure (defined type) of the method result will be known. Thus the result object's structure can be defined before the query is executed. A defined query can be a class in the database. When the query is executed an instance of this class can be created and populated. The result object can itself have methods. When these methods are executed secondary objects might be created. The execution of methods on result objects would be treated in the same way as the execution of methods for other objects in the database—message queue, non-blocking, etc. . . If desired, a series of result objects can be created.

This is illustrated in FIG. 1. The figure illustrates diagrammatically an object A, which is the client object. To show the process, assume that logically object A must send a message to two other objects B and C before it can determine where further processing is required within object A so that derived data from object A could be returned. This can be implemented as generated methods for objects A, B, C, and result object 1 such that object A sends the two messages (shown as message 1 and message 2), then sends any data that might be needed for the further processing (result 3) to result object 1. When object B is finished its processing, it sends a message (result 4) to result object 1, including result data from B. Object C does the same sending its result data (result 5) when it completes. B could complete before C or C before B. Thus, the messages each passes evokes separate methods in result object 1. Each of these methods tests whether the other has completed, by the presence of result data for the other in result object 1. If not, each just stores its separate result data in result object 1. If however, the other has completed, then further processing continues within result object 1, either with the presently executing method or by evoking another method in result object 1 such that result object 2 is created and result 6 is sent to it. Result object 2, in this example, then holds the result of the query, and can output it as desired.

Figure 2:
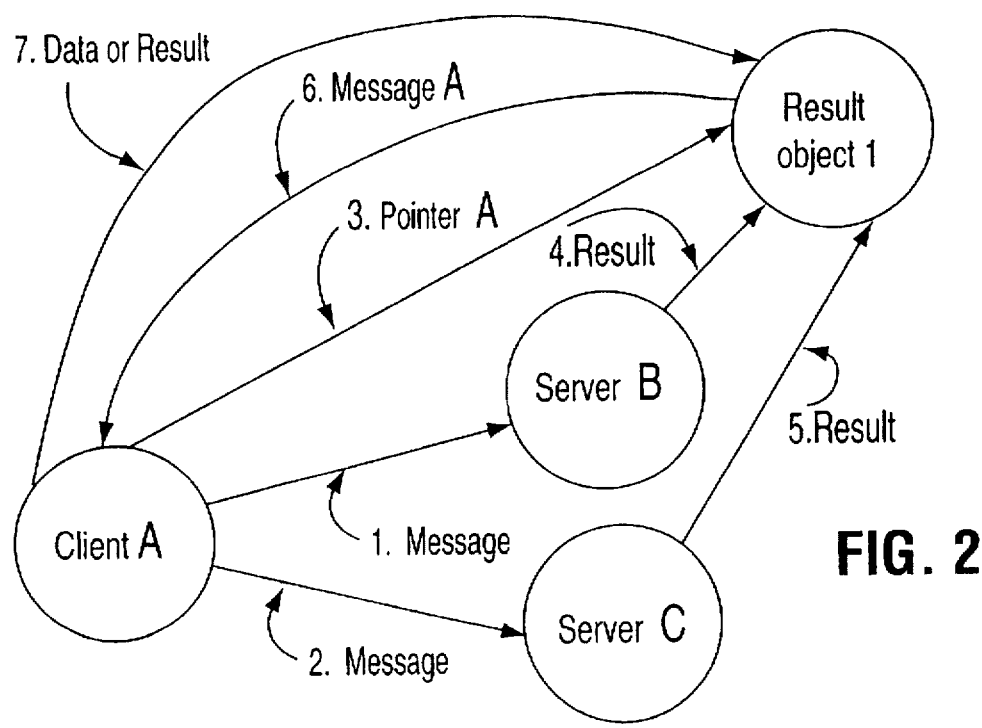
FIG. 2 is a diagrammatic representation of messages passing between objects according to another embodiment of the invention.

A variation of this processing scheme is shown in FIG. 2. All numbers have the same meaning as in FIG. 1. In this variation, the method performed in object 1 modifies result object 1 in place and does not create a result object 2. The process can stop here, with result object 1 holding the result of the query and outputting as desired. However, for further exemplification, in this example client object A sends a pointer A back to itself rather than sending all the data needed for further processing (as was done by results 3 in FIG. 1), thus requiring another message (message A)to pass from result object 1 back to object A 20 (which this time functions as a server). Object A can then pass its data unprocessed back to result object 1 or process the data within itself and then pass back results to result object 1 (data or results 7).

It will be understood that the foregoing shows particular embodiments of the invention, and that they are not intended to limit the scope of the invention, which is as set out in the attached claims.

What is claimed is:

1. A method of query processing in a database wherein data is sought to be retrieved and combined using at least two objects, which comprises;
   (A) sending at least one message from a first object to at least one second object within the database, said message specifying criteria for a join,
   (B) said message being acted upon by the method of the second object to form at least one output from each second object which has some of the data sought or other potentially relevant data, each such output containing some of the data sought or data which is related or potentially related to the data sought or a pointer to such data,
   (C) each said output proceeding independently either to another object so said output can be acted upon by the method of such other object to form a further output or to a results object which stores final or intermediate results, and
   (D) each object which has sent an output not awaiting replies from other objects to which its output has been sent before finishing its processing.

2. A method as claimed in claim 1 in which data which is related or potentially related to the data sought is sent to a results object.

3. A method as claimed in claim 1, in which an object having data which is related or potentially related to the query sends a pointer to the results object, whereby the results object can locate the object with the potentially useful data should the data be required to respond to the query.

4. A method as claimed in claim 1, in which a message is sent out in step (A) of claim 1 to all objects within a class of objects.

5. A method as claimed in claim 1, in which a plurality of messages is sent out during step (A) of claim 1, and some such messages are sent to individual objects and, others are sent to groups of objects, and each said second object which receives both types of messages processes both types of messages from a queue.

6. A message as claimed in claim 5, in which the messages are accorded different priorities for processing according to whether they are messages to a group of objects or to said individual second object.

7. A method as claimed in claim 1, in which some messages as set out in step (A) of claim 1 are accorded different priorities, and such priorities are used to order messages in a queue for processing.

8. A method as claimed in claim 1 including the step of coordinating the processing of messages directed to groups of objects with the processing of messages directed to individual objects so that an individual second object is retrieved from physical storage to be processed by a thread, all messages directed to that individual object and directed to the groups of objects which include that object are processed as they relate to that object, and one or more output messages are generated by that object as set out in step (B) of claim 1 prior to processing of another second object by the thread.

9. A method as set out in claim 1 which includes the additional step of maintaining counts of unprocessed outstanding messages generated in steps (A), through (D) and reporting that the query has been completed when such counts are all zero.

10. In a distributed database having network nodes, the improvement in query processing which comprises
   A) sending at least one message from an object on a first node to at least one object on a second node within the database,
   B) said message being acted upon by the method of the second object to form at least one message from each second object which has some of the data sought or other potentially relevant data, each such output containing some of the data sought or data which is related or potentially related to the data sought or a pointer to such data,
   (C) each said output proceeding independently either to another object so said output can be acted upon by the method of such other object to form a further output or to a results object which stores final or intermediate results, and
   (D) each object which has sent an output not awaiting replies from other objects to which its output has been sent before finishing its processing,
   (E) maintaining a message count of unprocessed outstanding messages generated in steps (A) through (C) at each node which receives such messages, and
   (F) causing such node to notify all other nodes which have sent it messages when its local processing is complete.

* * * * *